United States Patent [19]
Okunishi et al.

[11] 3,994,268
[45] Nov. 30, 1976

[54] INTERNAL COMBUSTION ENGINE

[75] Inventors: Hiroshi Okunishi, Niiza; Takeo Tsuchiya, Tokyo, both of Japan

[73] Assignee: Honda Giken Kogyo Kabushiki Kaisha, Tokyo, Japan

[22] Filed: Oct. 10, 1974

[21] Appl. No.: 513,827

[30] Foreign Application Priority Data
Oct. 15, 1973 Japan.............................. 48-114766

[52] U.S. Cl............................ 123/97 B; 123/32 ST; 123/75 B; 123/127; 261/23 A
[51] Int. Cl.² ......................................... F02D 31/00
[58] Field of Search........... 123/75 B, 32 SP, 32 ST, 123/127, DIG. 4, 75 B; 261/69 A, 121 B, 23 A, DIG. 74, 97 B

[56] References Cited
UNITED STATES PATENTS

| | | | |
|---|---|---|---|
| 3,124,113 | 3/1964 | May et al. ......................... | 123/75 B |
| 3,548,792 | 12/1970 | Palmer............................ | 261/121 B |
| 3,549,133 | 12/1970 | Frankowski et al. ............. | 261/69 A |
| 3,588,058 | 6/1971 | Lucas................................ | 261/69 A |
| 3,677,241 | 7/1972 | Gele et al........................... | 123/97 B |
| 3,761,063 | 9/1973 | Shibanatia et al. ............... | 261/69 A |
| 3,842,810 | 10/1974 | Yagi et al......................... | 123/32 ST |
| 3,878,826 | 4/1975 | Date et al.......................... | 123/75 B |
| 3,884,197 | 5/1975 | Miyaki et al. .................... | 123/32 ST |

Primary Examiner—Wendell E. Burns
Assistant Examiner—David D. Reynolds
Attorney, Agent, or Firm—Lyon & Lyon

[57] ABSTRACT

An internal combustion spark ignition piston engine has a main combustion chamber and an auxiliary combustion chamber connected by a torch opening. A main carburetor supplies a lean mixture to the main combustion chamber and an auxiliary carburetor supplies a rich mixture to the auxiliary combustion chamber. A fixed orifice is provided in the auxiliary carburetor, instead of a movable throttle valve, the orifice being smaller than the torch opening but large enough to allow air flow at subsonic velocities when the engine is operated under idle conditions. A throttle valve in the main carburetor controls the speed of the engine but the fixed orifice limits the amount of rich mixture supplied to the engine. A fuel compensator system is provided for each of the carburetors to control the air-fuel ratio of the mixture produced by each, in response to engine operating conditions, including idling, high power and deceleration.

1 Claim, 6 Drawing Figures

INTERNAL COMBUSTION ENGINE

This invention relates to internal combustion engines and is particularly directed to an improved carburetor system for a spark ignition piston engine in which each cylinder has a main combustion chamber and an auxiliary combustion chamber connected by a torch opening. A main carburetor supplies lean mixture to each main combustion chamber and an auxiliary carburetor supplies rich mixture to each auxiliary combustion chamber.

In accordance with this invention, a fixed orifice is placed in the barrel of the auxiliary carburetor. This orifice is smaller than the torch opening but is large enough to permit the air flow at subsonic velocities through the fixed orifice when engine is operated under idle conditions. An important advantage is that the auxiliary throttle valve for the rich mixture is eliminated. Instead, there is provided a fuel compensator system for each carburetor which varies the concentration of mixture produced in each carburetor in accordance with engine operating conditions. Thus, at idle speed, the rich mixture produced by the auxiliary carburetor is leaned to some extent by its fuel compensator system, while at high power operation of the engine the lean mixture produced by the main carburetor is richened somewhat by its fuel compensator system. Also, provision is made for richening the rich mixture from the auxiliary carburetor during engine deceleration periods. All of these changes in air-fuel ratio are made to retain the best air-fuel ratio in the auxiliary chamber for optimum spark ignition, while at the same time enabling the engine to perform throughout its range without discharging excess pollutants into the air in its exhaust gases.

Also because of a slight reverse rotation of the engine that takes place during stopping operation of the engine, residual compressed gas in a cylinder of the engine may flow back into the auxiliary intake barrel and in such case the great throttle resistance of said fixed orifice is utilized to prevent increase in vacuum pressure in the fuel nozzle. This prevents an unnecessary spurt of fuel and constitutes a further advantage of this invention.

Other and more detailed objects and advantage will appear hereinafter.

Figure 1:
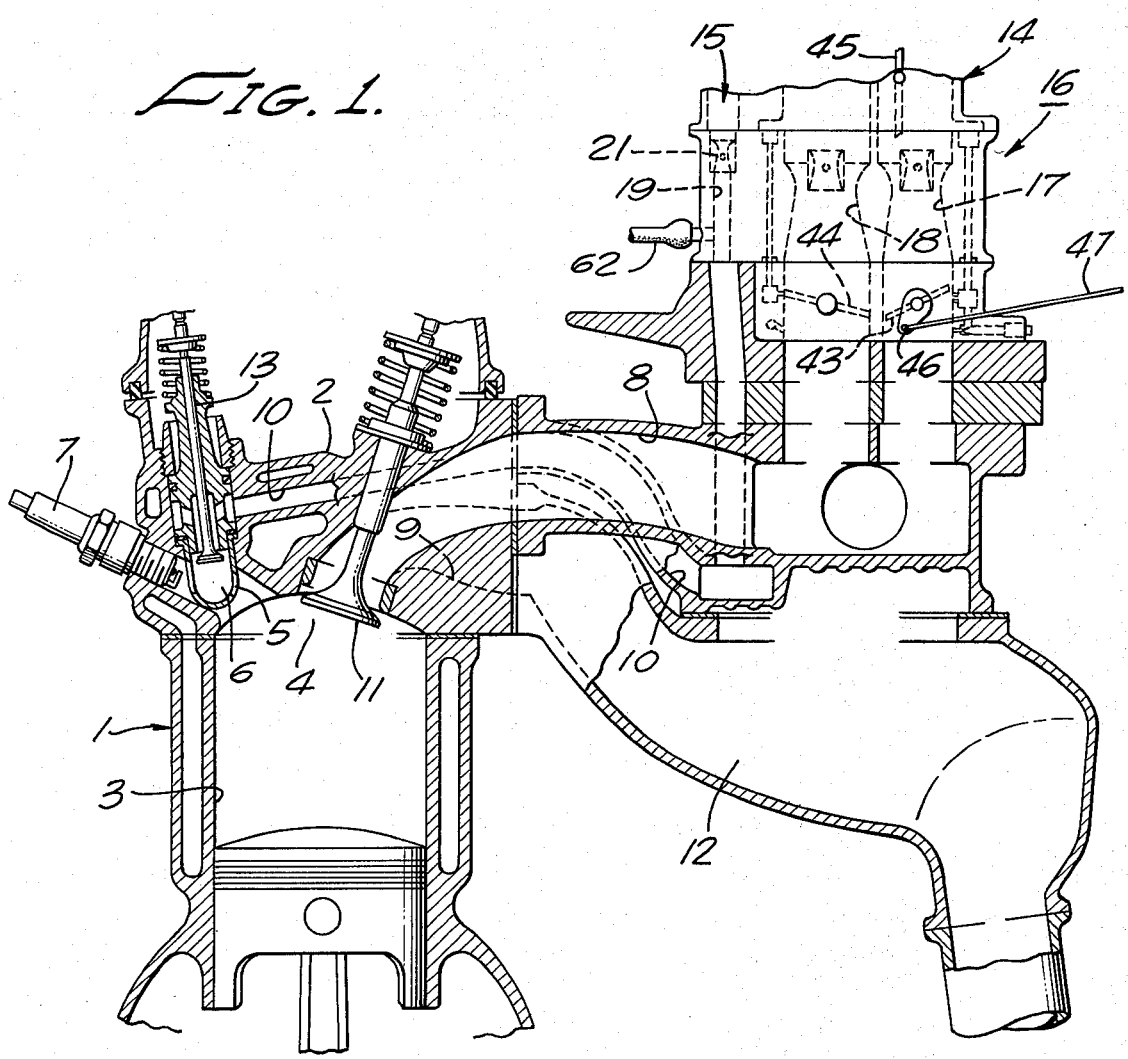
FIG. 1 is a sectional side elevation of an internal combustion engine embodying this invention.

Referring to the drawings, the internal combustion engine generally designated 1 includes an engine head 2 which forms the main combustion chamber 4 at the upper end of the cylinder 3. An auxiliary combustion chamber 6 is connected to the main combustion chamber 4 through a torch opening 5. The auxiliary chamber 6 is smaller in volume than the main chamber 4. The spark plug 7 mounted on the engine head 2 is positioned to ignite a mixture within the auxiliary chamber 6.

The main intake passage 8 communicates with the main combustion chamber 5 through the main inlet valve 11. Similarly, the auxiliary intake passage 10 communicates with the auxiliary chamber 6 through the auxiliary inlet valve 13. An exhaust valve, not shown, controls flow of exhaust gases from the main combustion chamber 4 through the exhaust passage 9 and then into the exhaust housing 12. The main intake passage 8 and the auxiliary intake passage 10 are placed adjacent to the exhaust passage 9 so that vaporization of the mixtures in both passages is assured by heat of the exhaust gases.

The main intake passage 8 is connected to a main primary intake barrel 17 and a main secondary intake barrel 18 of a main carburetor 14. Both barrels 17 and 18 produce a lean mixture. The auxiliary intake passage 10 is connected to auxiliary intake barrel 19 of the auxiliary carburetor 15 which produces a rich mixture. The main and auxiliary carburetors 14 and 15 constitute a single carburetor assembly 16, and they are equipped with a common float chamber 20.

Figure 2:
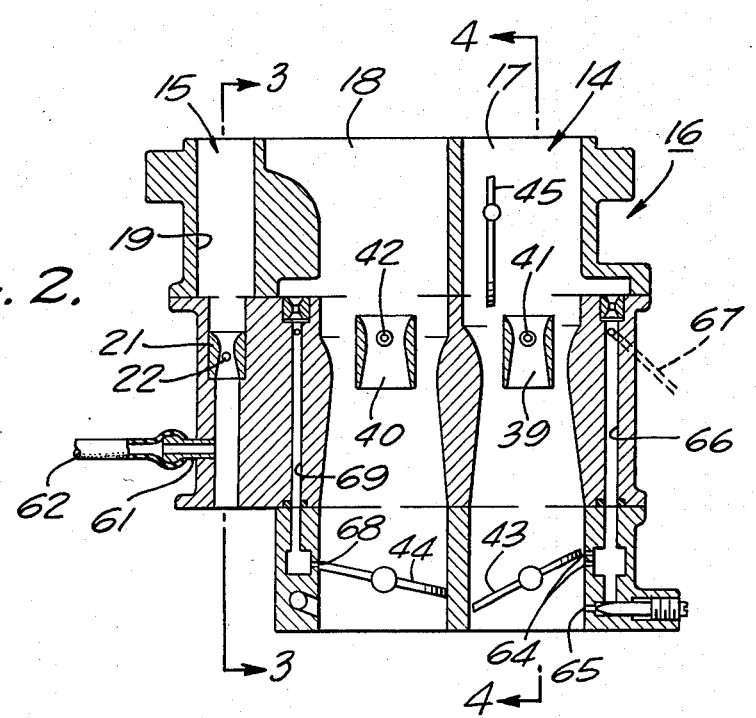
FIG. 2 shows an enlargement of a portion of FIG. 1, showing the carburetor assembly.
Figure 3:
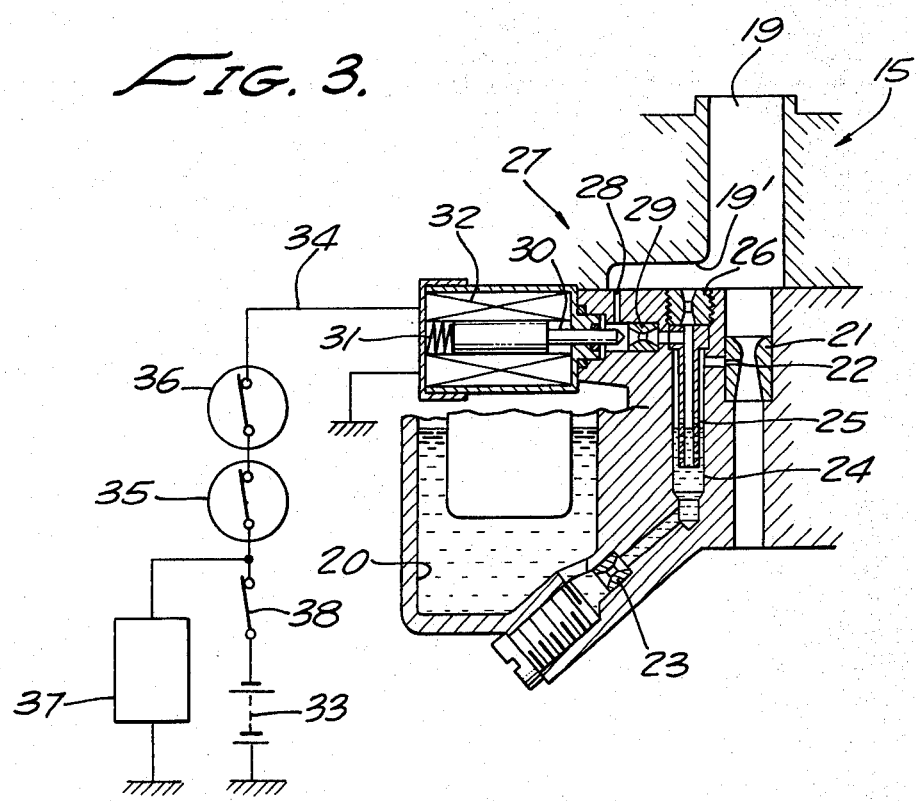
FIG. 3 is a sectional elevation taken substantially on the lines 3—3 as shown in FIG. 2.
Figure 4:
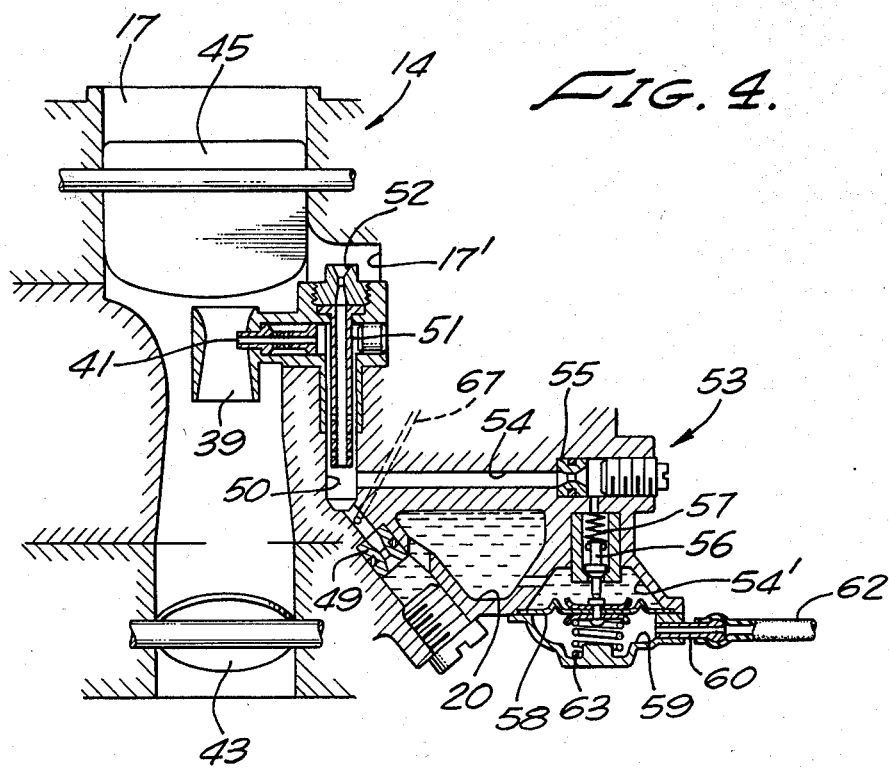
FIG. 4 is a sectional elevation taken substantially on the lines 4—4 as shown in FIG. 2.

The carburetor assembly 16 is best shown in FIGS. 2, 3 and 4. In the middle section of the auxiliary intake barrel 19, there is positioned a fixed orifice 21 of Laval nozzle shape which is smaller in its minimum cross section than the cross section area of the torch opening 5 connecting the auxiliary chamber 6 to the main chamber 4. The size of this orifice 21 is chosen so that during idling of the engine the velocity of air flow through this orifice is less than the speed of sound. A fuel nozzle 22 opens into the tapered portion down stream from the fixed orifice 21. This fuel nozzle 22 is connected to the float chamber 20 through a fuel passage 24 fitted with a fuel jet 23. The fuel passage 24 also receives an air bleed pipe 25, and to the upper end thereof a first air jet 26 is connected. This air jet 26 opens into a cavity 19' formed in the internal wall of the auxiliary intake barrel 19 upstream from the fixed orifice 21.

In this fuel system of the auxiliary carburetor 15 a first fuel compensator system 27 controls the concentration of the rich mixture produced in the auxiliary intake barrel 19. An auxiliary air passage 28 bypasses the first air jet 26 and is connected to the upper part of the air bleed pipe 25. A normally closed solenoid valve 30 is installed to control the flow through a second air jet 29 from the auxiliary air passage 28. This solenoid valve 30 is normally closed by force of a spring 31 and is opened when the solenoid 32 is electrically energized. The solenoid valve 30 controls the rate of bleed air which mixes with fuel in the fuel passage 24, and in this way the fuel concentration is controlled for the mixture produced in the auxiliary intake barrel 19. As an alternative, this first fuel compensator system 27 may be constructed for direct control of the rate of fuel flowing through the fuel passage 24.

The electrical line 34 connecting the solenoid 32 to a power source 33 includes in series a first sensor switch 35 which closes when a main primary throttle valve 43, described below, is in an idling position and it is otherwise open. A second sensor switch 36 in the electrical line 34 opens when the engine speed is at a certain value higher than the idling speed, and closes when the engine speed is at any lower value. The ignition circuit of the engine is shown at 37 and the ignition switch is shown at 38.

In the main primary intake barrel 17 and in the main secondary intake barrel 18, a primary and secondary high speed fuel nozzle 41 and 42 open into primary and secondary venturis 39 and 40, respectively, in the same manner as with conventional compound carburetors. Downstream from the primary and secondary venturis 39 and 40 are installed a primary and a secondary throttle valve 43 and 44, respectively. Upstream from the primary venturi 41 a choke valve 45 is provided. An operating wire 47 (FIG. 1) is connected to an operating lever 46 of the primary throttle valve 43. A vacuum actuator (not shown) of conventional type operates the secondary throttle valve 44, the vacuum actuator opening the throttle valve 44 during high power operation of the engine.

The primary high speed nozzle 41 (FIG. 4) is connected to the float chamber 20 through a fuel passage 50. This fuel passage 50 is equipped with a first fuel jet 49. An air bleed pipe 51 is inserted into the fuel passage 50 and an air jet 52 is installed in the upper end thereof. This air jet 52 opens into the cavity 17' formed in the internal wall of the main intake barrel 17 upstream from the primary Venturi 39.

The fuel system of the main carburetor 14 includes a second fuel compensator system 53 shown in FIG. 4. This controls the concentration of the mixture produced in the main intake barrel 17. An auxiliary fuel passage 54 communicates with the fuel passage 50 so as to bypass the first fuel jet 49. A second fuel jet 55 communicates with the auxiliary fuel passage 54. A normally closed operating valve 56 also communicates with the second fuel jet 55 and is normally closed by its spring 57. Accordingly, operation of the valve 56 controls the flow rate of fuel through the fuel passage 50 and this serves to adjust the concentration of the mixture produced in the main intake barrel 17.

A flexible diaphragm 58 is placed at one end of the operating valve 56. The space 54' above the flexible diaphragm 58 is in communication with the float chamber 20. On the lower side of the diaphragm 58 is formed a vacuum chamber 59, with a vacuum signal pipe 62 connecting between a vacuum intake pipe 60 of the vacuum chamber 59 and a vacuum take-out pipe 61 (FIG. 2) provided downstream from the fixed orifice 21 in the auxiliary intake barrel 19. A return spring 63 in the vacuum chamber 59 acts in a direction to open the valve 56 against the weaker spring 57.

The primary low speed fuel nozzle 64 and the slow speed fuel nozzle 65 are both connected to an air bleed passage 66 and a fuel passage 67. The secondary low speed nozzle is shown at 68, and the air bleed passage 69 is connected thereto.

In operation, a lean mixture and a rich mixture are produced in the main and auxiliary carburetors 14 and 15 and are drawn into the main and auxiliary combustion chambers 4 and 6 through the main and auxiliary intake passages 8 and 10, respectively, during each intake stroke of the pistons. A portion of the rich mixture is drawn through the torch opening 5 into the main chamber 4. During the compression stroke of the piston a part of the rich mixture and some of the lean mixture in the main chamber 4 are forced back through the torch opening 5 into the auxiliary chamber 6 to produce a mixture in the auxiliary chamber 6 having an air-fuel ratio of optimum richness for spark ignition. At the end of each compression stroke, the spark plug 7 ignites the mixture in the auxiliary chamber 6 and this produces a flame which projects through the torch opening 5 to burn the lean mixture in the main combustion chamber. The engine is operated with an overall lean air-fuel ratio.

Figure 5:
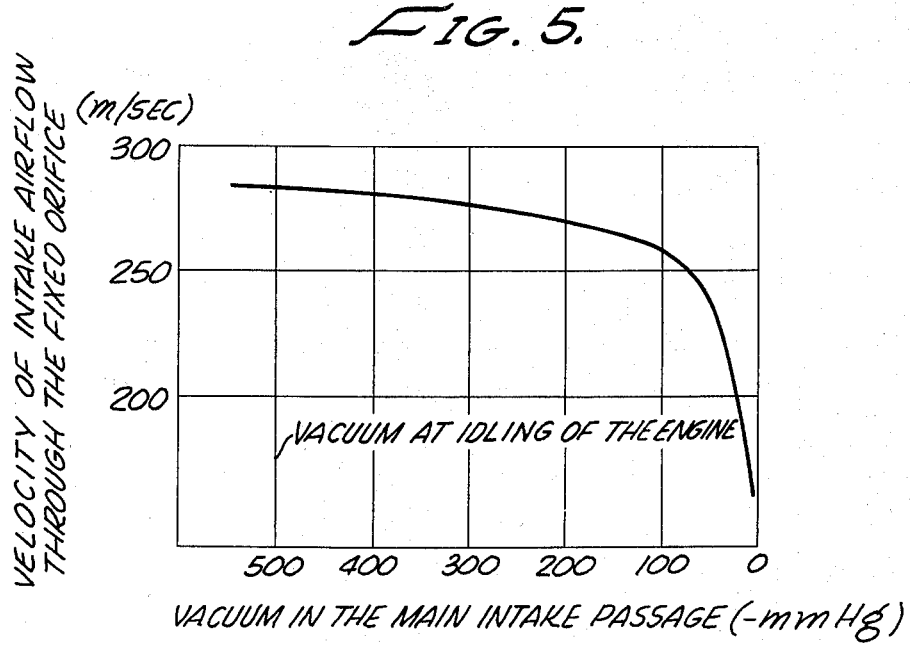
FIG. 5 is a diagram showing the relation between velocities of intake air flow through the fixed orifice and vacuum pressure in the main intake passage.
Figure 6:
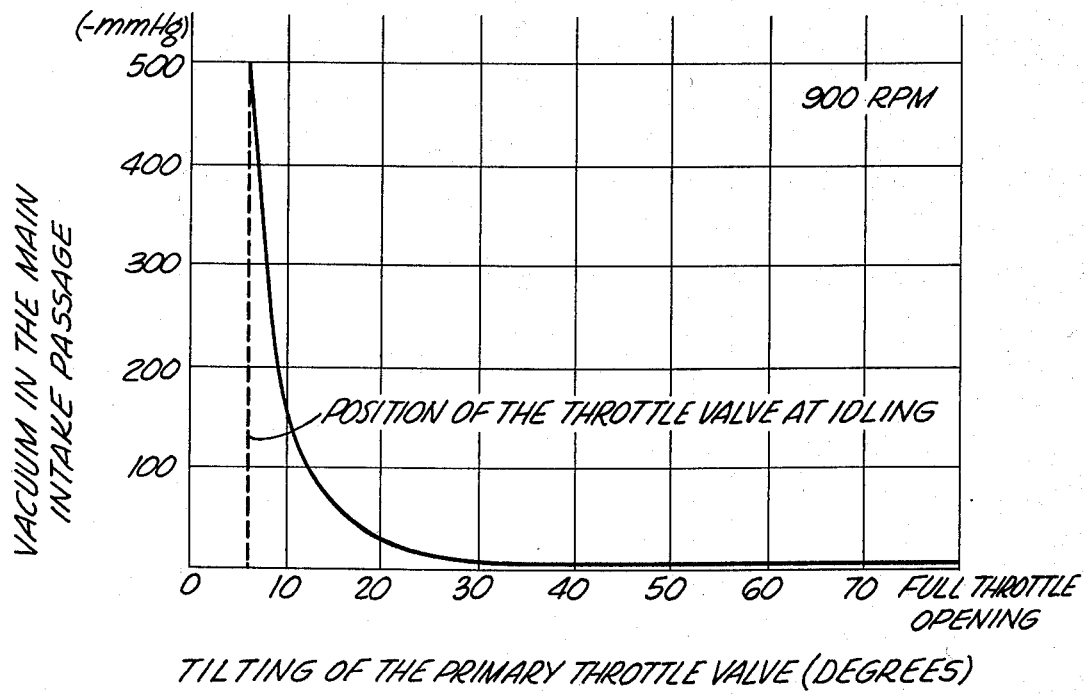
FIG. 6 is a diagram showing the relation between vacuum pressure in the main intake passage and the degree of tilting of the primary throttle valve.

When the engine is idling, the first sensor switch 35 which opens in response to the throttle valve 43, and the second sensor switch 36 which opens in response to engine speed, are both closed, so that the solenoid 32 is electrically energized. The valve 30 is thus opened to allow bleed air to enter the fuel passage 24 from both air jets 26 and 29 in relatively large quantity to form as well as to dilute the fuel which jets out through the fuel nozzle 22. Therefore, the rich mixture produced in the auxiliary intake barrel 19 is made somewhat leaner in concentration, and when this leaner mixture is drawn into the auxiliary combustion chamber 6, it is slightly diluted during the compression stroke, with a relatively small amount of lean mixture that enters from the main combustion chamber 4, as described above. Expressed in other words, because the amount of lean mixture taken into the main combustion chamber 4 during idling of the engine is small and therefore the rate of dilution of the rich mixture in the auxiliary chamber 6 during the compression stroke is also small, the richness of the mixture produced in the auxiliary carburetor 15 is also reduced to compensate. Therefore, during idling of the engine, the speed of intake air flow through the fixed orifice 21 is established, as shown in FIG. 5, at a subsonic velocity (preferably not less than 250 meters per second). When the operating wire 47 is pulled to open the throttle valve 43, the vacuum pressure in the main intake passage 8 is reduced sharply, as shown in FIG. 6, until the throttle valve tilting has reached approximately 20°. By contrast, the speed of intake air flow through the fixed orifice 21 decreases very slowly, as shown in FIG. 5 so that it remains above 250 meters per second even when the vacuum pressure in the intake manifold falls to −100 mm Hg. Therefore, the vacuum pressure acting on the fuel nozzle 22 is maintained substantially stable to allow fuel to jet out therethrough without interruption.

With increase in tilting of the primary throttle valve 43, as shown in FIG. 6, the amount of lean mixture taken into the main combustion chamber 4 increases to increase the rate of dilution of rich mixture in the auxiliary combustion chamber 6. However, when the primary throttle valve 43 moves away from idling position, the first sensor switch 35 opens, interrupting the electrical circuit through the solenoid 32. The spring 31 closes the valve 30, making the second air jet 29 inoperative. Accordingly, the amount of bleed air mixing with fuel in the fuel passage 24 is reduced, to increase the concentration of the rich mixture. Thus, the rich mixture drawn into the auxiliary combustion chamber 6 is never diluted excessively during the compression stroke of the engine, but on the contrary maintains an optimum air-fuel ratio for spark ignition.

Fuel supply in the main carburetor 14 is performed by the slow speed fuel nozzle 65, by the primary low speed fuel nozzle 64, and by the primary high speed fuel nozzle 41 in succession. However, when the vacuum pressure in the auxiliary intake barrel 19 is at a relatively high value, this vacuum pressure is transmitted through the vacuum signal pipe 62 to the vacuum chamber 59 to cause the diaphragm 58 to move back against the return spring 63, so that the operating valve 56 remains closed, and during such time fuel supplied through the low speed or high speed fuel nozzle 64 or 41 is metered by the first fuel jet 49 acting alone. However, when the tiling of the throttle valve 43 exceeds about 20°, the speed of air flow through the fixed orifice 21 lowers rapidly, and consequently the amount of rich mixture taken into the auxiliary combustion chamber 6 decreases to make it inevitable, if nothing were done to prevent it, that the concentration of the rich mixture in the auxiliary chamber 6 would become too weak for good ignition. However, in accordance with this invention, the vacuum chamber 59 quickly senses decrease in vacuum pressure in the auxiliary intake barrel 19 to allow the diaphragm 58 to move upward under the force of the return spring 63 and thereby open the operating valve 56. Fuel metered by the second fuel jet 55 joins with the fuel metered by the first fuel jet 49 to emerge through the high speed fuel nozzle 41, so that the air-fuel ratio of the mixture produced is caused to be richer in fuel. Because a part of this relatively rich mixture enters into the auxiliary combustion chamber 6 during the compression stroke of the engine, rich mixture in the auxiliary combustion chamber 6 is never too low in concentration.

During high speed operation of the engine, when the primary throttle valve 43 is closed suddenly to an idling position so as to decelerate the engine, the first sensor switch 35 is closed in consequence thereof, but the second sensor switch 36 maintains an open position as long as the engine speed does not fall to a predetermined value near the idling speed. Therefore, the first fuel compensator system still acts to increase the concentration of the mixture, and part of this rich mixture is drawn into the main combustion chamber 4 through the torch opening 5 during intake strokes of the engine. This compensates for insufficiency in the richness concentration and the amount of the lean mixture with which the main combustion chamber 4 is being filled, so that misfire does not develop in the main combustion chamber 4.

Immediately after the ignition switch 38 is turned off to stop the engine during operation thereof, the engine may turn reversely to some extent by residual compressed gas in a cylinder 3, and even though this compressed gas flows back to the auxiliary intake barrel 19, it is throttled rapidly by the fixed orifice 21, so that pressure in the auxiliary intake barrel 19 between the fixed orifice 21 and the auxiliary combustion chamber 6 rises to apply positive pressure to the opening of the fuel nozzle 22 which opens into that area, and fuel supply therethrough is immediately restrained.

Since the fixed orifice 21 in the auxiliary intake barrel 19 is smaller in the opening area than the torch opening 5, and since the size of the fixed orifice is determined so that the speed of intake air flow through it during idling of the engine occurs at subsonic velocities, there is an advantageous operating characteristic which results. Thus, even when the vacuum pressure in the main intake passage 8 changes substantially because the variation in load within the range of lower power operation of the engine, such a change will have little effect on the auxiliary intake barrel 19 and, therefore, operation of the auxiliary carburetor 15 producing a rich mixture is maintained substantially stable, enabling the auxiliary combustion chamber 6 to produce a good torch flame through the torch opening 5. The engine operates on an overall air-fuel mixture which is extremely lean, and in addition the necessity is eliminated of providing any throttle valve in the auxiliary intake barrel 19, thus simplifying the construction.

By compensating for the overly rich mixture produced in the auxiliary carburetor 15 during idling of the engine, through an automatic reduction by means of the first fuel compensator system 27, the richness in the auxiliary combustion chamber 6 is maintained at a proper concentration for spark ignition. Also, by compensating for insufficient fuel in the mixture produced in the main carburetor 14 during high power operation of the engine, through an automatic increase by means of the second fuel compensator system 53, any tendency in the auxiliary combustion chamber toward reduction of fuel concentration due to slowdown of the velocity of air flow through said fixed orifice is overcome, so as to accomplish good operational characteristics under high power operation of the engine.

The first fuel compensator system 27 compensates for insufficiency of the amount and concentration of lean mixture which fills the main combustion chamber 4 during deceleration of the engine, so that the exhaust of unburned components as a result of misfire is prevented from occurring.

By opening the fuel nozzle 22 in the auxiliary intake barrel 19 downstream of the fixed orifice 21, excessive amounts of fuel are restrained from jetting out through the fuel nozzle 22 by virtue of the great throttling action of the fixed orifice 21 even when compressed gas flows back into the auxiliary intake barrel 19 during the stopping operation of the engine. The result is that when the engine is restarted, the auxiliary combustion chamber 6 is prevented from being supplied with excessive fuel and the spark plug 7 from being fouled, and therefore a good spark discharge takes place.

Having fully described our invention, it is to be understood that we are not be limited to the details herein set forth but that our invention is of the full scope of the appended claims.

We claim:

1. In an internal combustion spark ignition piston engine having a main combustion chamber and an auxiliary combustion chamber connected by a torch opening, a main carburetor producing a lean mixture, means including a main passage for delivering the lean mixture to the main combustion chamber, an auxiliary carburetor producing a rich mixture, and means including an auxiliary passage for delivering rich mixture to said auxiliary combustion chamber, the improvement comprising, in combination: a fixed orifice in said auxiliary carburetor upstream from said auxiliary passage, said orifice being large enough to allow air flow at subsonic velocities when the engine is operated under idle conditions, a fuel compensator system associated with the auxiliary carburetor and operating to control the air-fuel ratio of the mixture produced therein, and sensor means responsive to engine operating conditions for causing the compensator system to vary the concentration of the mixture produced by that carburetor, said auxiliary carburetor upstream from said auxiliary passage having no movable throttle valve, a movable throttle valve in said main carburetor upstream from said main passage, whereby said fixed orifice serves to control the amount of rich mixture delivered to the auxiliary chamber when the main throttle valve is opened to cause the engine to operate at a speed greater than idle speed.

* * * * *

UNITED STATES PATENT AND TRADEMARK OFFICE
CERTIFICATE OF CORRECTION

PATENT NO. : 3,994,268
DATED : November 30, 1976
INVENTOR(S) : Hiroshi Okunishi et al It is certified that error appears in the above—identified patent and that said Letters Patent are hereby corrected as shown below:

First page, Item [30], second line, should read:
--Oct. 15, 1973 Japan . . . . 48-114761--

Signed and Sealed this

Fifteenth Day of February 1977

[SEAL]

Attest:

RUTH C. MASON
*Attesting Officer*

C. MARSHALL DANN
*Commissioner of Patents and Trademarks*